Oct. 9, 1962 K. F. FRANK 3,057,209
SEISMIC VIBRATION PICKUP MEANS
Filed March 16, 1959 2 Sheets-Sheet 1

INVENTOR.
BY KARL F. FRANK

Oct. 9, 1962

K. F. FRANK 3,057,209

SEISMIC VIBRATION PICKUP MEANS

Filed March 16, 1959

INVENTOR.
KARL F. FRANK
BY

United States Patent Office 3,057,209
Patented Oct. 9, 1962

3,057,209
SEISMIC VIBRATION PICKUP MEANS
Karl F. Frank, Garden City, N.Y., assignor to Micro Balancing, Incorporated, Garden City Park, N.Y., a corporation of Delaware
Filed Mar. 16, 1959, Ser. No. 799,548
2 Claims. (Cl. 73—517)

This invention relates to vibration pickup means and more particularly to such means of a seismic type.

Seismic type pickups are much preferred in picking up and measuring vibrations, for instance, in connection with dynamic balancing machines, since the pickup itself is self-contained and is attached to the holder of the vibrating part. Therefore, it is isolated in respect to horizontal motions from the balancing machine frame due to floor vibration and other vibrations generated within the machine frame which would tend to distort the true vibration reading. Also, pickups of the seismic type only respond to one source of vibrations since they have no secondary reference point.

One of the main difficulties with seismic pickups, and other types as well, is that the natural resonance of the pickup itself must be made low enough so that it will not be within the frequency range being measured as such a condition would make an accurate measurement impossible. The resonant frequency is generally proportional to the moving mass, spring constant, and method of suspension, so that one approach is to make the moving mass of the pickup larger. However, it is not convenient for the pickup to be too large or bulky since that would limit its use.

Some seismic pickups are of the moving coil type. However, where the coil is moving there is a problem due to the effect of the mechanical loading of the coil leads. In the present invention the coils are made stationary in the pickup housing and a magnetic armature is suspended along the axis of the coils by means of a pendulus suspension member at each end. Also, the pickup coils are arranged in opposition so than an external magnetic field has no effect on the induced vibration voltage. In order to achieve a low resonant frequency with minimum size, the suspension members each comprise a folded pendulum. Since the natural period of the pendulum is proportional to its length this arrangement provides the minimum resonant frequency for a given size.

Accordingly, a principal object of the invention is to provide new and improved vibration pickup means.

Another object of the invention is to provide new and improved vibration pickup means of the seismic type.

Another object of the invention is to provide new and improved vibration pickup means of the seismic type having a low resonant frequency.

Another object of the invention is to provide new and improved vibration pickup means of the seismic type having a low resonant frequency with minimum size.

Another object of the invention is to provide a seismic pickup having stationary coil means and a movable armature suspended by folded pendulum means.

These and other objects of the invention will be apparent from the following specification and drawings, of which:

Figure 1:
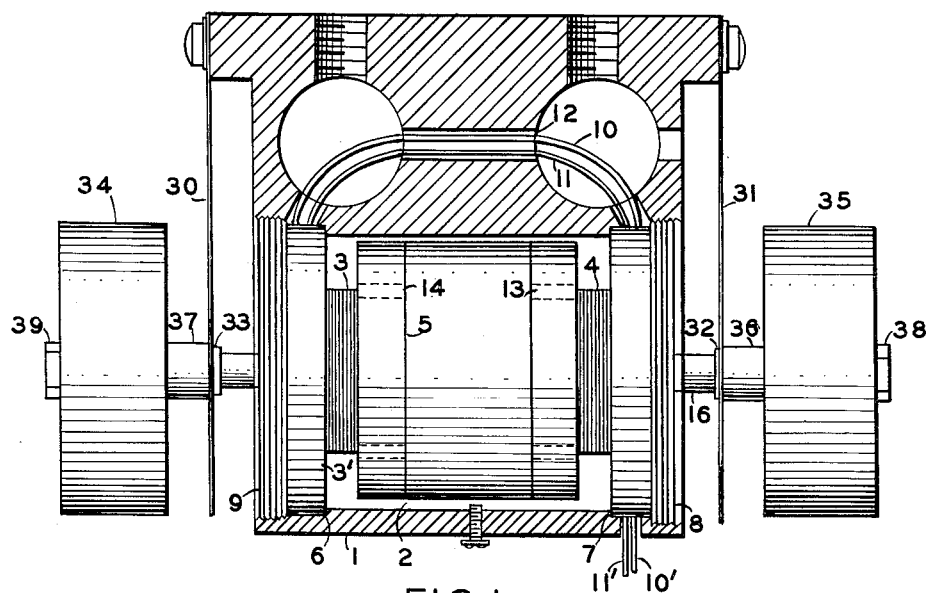
FIGURE 1 is a side view of an embodiment of the invention partially in section.

Referring to the figures, the invention comprises a base 1 which has a large hollow shaftway 2 to accommodate the coils 3 and 4 of the armature 5. The coil forms 3′ and 4′ are inserted in the shaftway 2 which has shoulders 6 and 7 to position them. The coil forms are held against the shoulders by means of the nuts 8 and 9 which are threaded on the outside and screwed into corresponding threaded portions of the base 1 shaftway. The coils are electrically connected in series by means of the leads 10 and 11 which extend through the connecting channel 12 in the base. The coils are wound in opposite directions when mounted so that their combined signal will be in phase.

Figure 4:
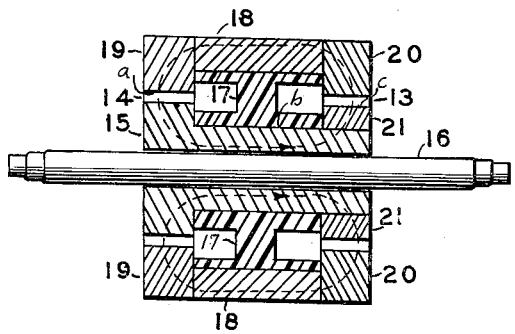
FIGURE 4 is a sectional view of the armature means.
Figure 5:
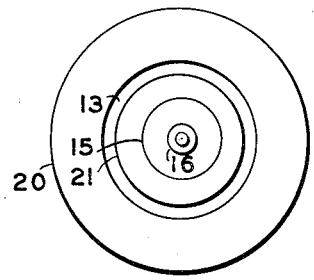
FIGURE 5 is an end view of the armature means.

The armature assembly has two circular slots 13 and 14, FIGURE 4, into which the coils project. The armature assembly is assembled as follows: An insulating spider 17, for instance, of phenolic material is fixedly mounted in a cylinder 18 of a permanent magnetic material. Rings 19 and 20 of the magnetic material are then soldered onto the ends of cylinder 18. The shaft 16 and attached member 15 are then inserted into the center shaftway of the insulating member 17 and lastly the ring 21 of magnetic material is soldered onto the member 15 to complete the assembly member 15 is of magnetic material such as soft iron.

The edges a, b, c, are preferably bored and finished in carefully controlled machinery operations to obtain maximum accuracy of concentricity and spacing of the circular magnetic gaps 13 and 14. The magnetic circuits are shown by the dotted lines.

The armature shaft is mounted on a pair of folded pendulum members 30 and 31 by means of shoulder ferrules 32, 33 mounted on the shaft 16 which extends through holes in members 30 and 31. Additional external weights 34 and 35 are preferably mounted on the shaft extensions to provide a suitable mass. The weights are spaced by spacers 36, 37 and held by nuts 38, 39.

Figure 2:
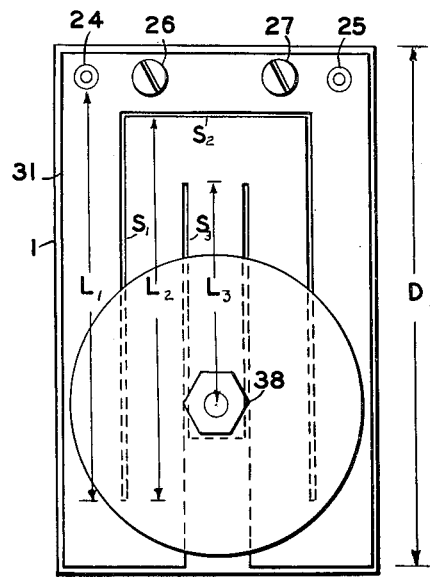
FIGURE 2 is an end view of the embodiment of FIGURE 1.

The folded pendulum suspension members each comprise a sheet of Phosphor bronze which is connected at its upper end to the base by means of the screws 26 and 27 and alignment pins 24, 25, FIGURE 2. The Phosphor bronze sheet operates as a leaf spring folded pendulum. It is slotted as shown in FIGURES 2 so that the effective length of the pendulum from the mounting comprises the lengths $L_1$ plus $L_2$ plus $L_3$. This arrangement provides the lowest natural frequency of the suspension member within the minimum space. Additional folds may be added to provide a lower natural frequency. In one embodiment it has been found that a suspension element having the dimension $D=2''$ would provide a natural frequency of the suspension system of less than 5 cycles a second which was sufficiently low for its intended purpose in a dynamic balancing machine.

Figure 6:
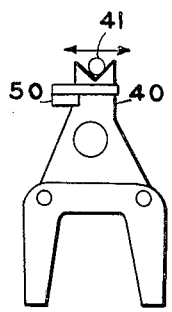
FIGURE 6 is an end view illustrating the use of the invention in a dynamic balancing machine.

FIGURE 6 shows the pickup 50 clamped to a supporting yoke 40 of a dynamic balancing machine. The test shaft 41 being tested is shown mounted in the V-block of the yoke 40. As the test piece is rotated, any unbalance will cause vibration in the horizontal plane shown by the arrows which will be detected by the pickup 38 and fed to appropriate apparatus for correcting the unbalance which is outside the scope of the present invention. The present pickup is designed for horizontal mounting and to measure vibrations in a single vertical plane.

Figure 3:
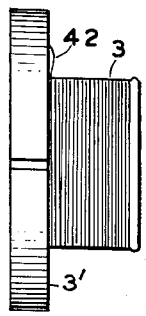
FIGURES 3 and 3A are side and end views of the coil means of the invention.
Figure 3A:
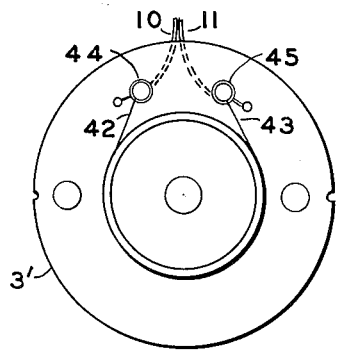

FIGURES 3 and 3A show detail views of the coils which are identical. In one embodiment the coils were wound of 1250 turns of No. 43 Formvar covered wire. The coil ends 42, 43 are soldered to eyelets 44. 45 to which leads 10, 11 are also connected. The coils are connected in series and external leads 10′, 11′, FIGURE 1, are connected to a voltage detecting device.

As previously mentioned the coils are connected in series and are oppositely wound so that each provides an in-phase signal. The coils are, therefore, not affected by external magnetic fields.

The stiffness of the pendulus spring mountings can be varied by changing the thickness of the suspension spring material. Material of .010″ thickness has been used in one embodiment which is sufficiently sensitive to detect vibrations of 1 microinch.

Therefore, the present invention provides seismic pickup means which is extremely sensitive, are not subject to external vibrations or magnetic fields, and which has an extremely low resonant frequency.

I claim:
1. A vibration detector comprising;
a mounting,
a stationary coil affixed to said mounting, said coil having a horizontal axis,
a magnetic armature, and
means to mount said armature coaxial with the said coil with substantially free horizontal motion along said axis, comprising;
a flexible member, said member being slotted to form a first pair of strip members fixedly mounted at their upper end,
a second pair of strip members each connected to the bottom of one of said first strip members and extending upwardly parallel to said first strip members, and
a third strip member connected to the common top of said two second strip members, and extending downwardly parallel said second strip members.
2. A vibration detector comprising;
a mounting,
a stationary coil affixed to said mounting, said coil having a horizontal axis,
a magnetic armature, and
means to mount said armature coaxial with the said coil with substantially free horizontal motion along said axis, comprising;
a pair of flexible plate members, each of said members being slotted to form
a first pair of strip members fixedly mounted at their upper end,
a second pair of strip members each connected to the bottom of one of said first strip members and extending upwardly parallel to said first strip members, and
a third strip member connected to the tops of said two second strip members, and extending downwardly parallel said second strip members, said armature being connected to said third strip member adjacent the bottom thereof so that said armature is suspended between the third strip members of each of said plate members.

References Cited in the file of this patent
UNITED STATES PATENTS

| | | |
|---|---|---|
| 2,183,002 | Bach | Dec. 12, 1939 |
| 2,424,724 | Tolk | July 29, 1947 |
| 2,533,249 | Hensen | Dec. 12, 1950 |
| 2,570,672 | Hathaway | Oct. 9, 1951 |
| 2,702,186 | Head | Feb. 15, 1955 |
| 2,744,335 | Litman | May 8, 1956 |
| 2,870,422 | Gindes | Jan. 20, 1959 |

FOREIGN PATENTS

| | | |
|---|---|---|
| 293,461 | Switzerland | Dec. 16, 1953 |